United States Patent
Armstrong et al.

(10) Patent No.: US 9,090,814 B2
(45) Date of Patent: Jul. 28, 2015

(54) WELL TREATMENT FLUIDS CONTAINING AN YLIDE OR A VITAMIN B AND METHODS OF USING THE SAME

(75) Inventors: Charles David Armstrong, Tomball, TX (US); Stanley Gunawan, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 331 days.

(21) Appl. No.: 13/570,485

(22) Filed: Aug. 9, 2012

(65) Prior Publication Data

US 2014/0041877 A1 Feb. 13, 2014

(51) Int. Cl.
*E21B 43/26* (2006.01)
*C09K 8/68* (2006.01)
*C09K 8/88* (2006.01)
*C09K 8/90* (2006.01)

(52) U.S. Cl.
CPC . *C09K 8/68* (2013.01); *C09K 8/685* (2013.01); *C09K 8/885* (2013.01); *C09K 8/887* (2013.01); *C09K 8/90* (2013.01); *C09K 2208/26* (2013.01); *E21B 43/26* (2013.01)

(58) Field of Classification Search
CPC ...... C09K 8/685; C09K 8/68; C09K 2208/26; C09K 8/90; C09K 8/74; C09K 8/887; E21B 43/267; E21B 43/26; E21B 43/16
See application file for complete search history.

(56) References Cited

U.S. PATENT DOCUMENTS

| | | | |
|---|---|---|---|
| 4,701,247 A * | 10/1987 | Kalnins et al. | 205/688 |
| 5,082,579 A | 1/1992 | Dawson | |
| 5,145,590 A | 9/1992 | Dawson | |
| 6,818,594 B1 | 11/2004 | Freeman et al. | |
| 7,078,370 B2 | 7/2006 | Crews | |
| 7,129,388 B2 | 10/2006 | Scalzi et al. | |
| 7,645,724 B2 | 1/2010 | Crews | |
| 7,832,475 B2 | 11/2010 | Jin et al. | |
| 7,879,770 B2 | 2/2011 | Lin et al. | |
| 7,977,056 B2 | 7/2011 | Toledo et al. | |
| 2005/0130845 A1 | 6/2005 | Freeman et al. | |
| 2005/0227874 A1 | 10/2005 | Berger et al. | |
| 2005/0272612 A1 | 12/2005 | Dawson et al. | |
| 2007/0251146 A1 | 11/2007 | Larter et al. | |
| 2008/0070806 A1 | 3/2008 | Lin et al. | |
| 2010/0048429 A1 * | 2/2010 | Dobson et al. | 507/212 |
| 2010/0056402 A1 | 3/2010 | Li et al. | |
| 2010/0163230 A1 | 7/2010 | Kotlar | |
| 2010/0197531 A1 | 8/2010 | Crews et al. | |
| 2011/0017457 A1 | 1/2011 | Samuel et al. | |
| 2011/0247821 A1 * | 10/2011 | Thompson et al. | 166/305.1 |

FOREIGN PATENT DOCUMENTS

CA 2768162 A1 8/2012
CN 102260523 A * 11/2011

* cited by examiner

*Primary Examiner* — Zakiya W Bates
(74) *Attorney, Agent, or Firm* — John Wilson Jones; Jones & Smith, LLP

(57) ABSTRACT

Viscosifying polymers are effectively degraded during a well treatment operation with an ylide breaker or a vitamin B cofactor. The vitamin B cofactor is an ylide, vitamin $B_1$, vitamin $B_2$, vitamin $B_3$, vitamin $B_6$, vitamin $B_9$ or vitamin $B_{12}$ or mixtures thereof. Such breakers are effective at room and elevated temperatures and high pH environments.

23 Claims, 4 Drawing Sheets

WELL TREATMENT FLUIDS CONTAINING AN YLIDE OR A VITAMIN B AND METHODS OF USING THE SAME

FIELD OF THE INVENTION

An ylide or a vitamin B selected from the group consisting of vitamin $B_1$, $B_2$, $B_3$, $B_6$, $B_9$ and $B_{12}$ has particular applicability as a breaker in well treatment fluids.

BACKGROUND OF THE INVENTION

Hydraulic fracturing is used to create subterranean fractures that extend from the borehole into the rock in order to increase the rate at which fluids can be produced from the formation. Generally, a fracturing fluid is pumped into the well at high pressure. Once natural reservoir pressures are exceeded, the fracturing fluid initiates a fracture in the formation which continues to grow during pumping. The treatment design generally requires the fluid to reach maximum viscosity as it enters the fracture.

The fracturing fluid typically contains a proppant which is placed within the produced fracture. The proppant remains in the produced fracture to prevent the complete closure of the fracture and to form a conductive channel extending from the wellbore into the treated formation.

Most fracturing fluids contain a viscosifying agent in order to increase the capability of proppant transport into the fracture. Suitable viscosifying agents include synthetic polymers, like polyvinyl alcohols, polyacrylates, polypyrrolidones and polyacrylamides, and polysaccharides, like guar gum (galactomannans) and guar gum derivatives. Exemplary guar or guar gum derivatives include hydroxypropyl guar (HPG), carboxymethyl guar (CMG) and carboxymethylhydroxypropyl guar (CMHPG) as well as high molecular weight non-derivatized guar.

Once the high viscosity fracturing fluid has carried the proppant into the formation, breakers are used to reduce the fluid's viscosity. In addition to facilitating settling of the proppant in the fracture, the breaker also facilitates fluid flowback to the well. Breakers work by reducing the molecular weight of the viscosifying agent. The fracture then becomes a high permeability conduit for fluids and gas to be produced back to the well.

Common breakers for use in fracturing fluids include chemical oxidizers, such as hydrogen peroxide and persulfates. Chemical oxidizers produce a radical which then degrades the viscosifying agent. This reaction is limited by the fact that oxidizers work in a stiochiometric fashion such that the oxidizer is consumed when one molecule of oxidizer breaks one chemical bond of the viscosifying agent. Further, at low temperatures, such as below 120° F., chemical oxidizers are generally too slow to be effective and other catalysts are needed to speed the rate of reaction. At higher temperatures, chemical oxidizers function very rapidly and often must be encapsulated in order to slow the rate of reaction. Alternatives have been sought for maximizing the efficiency of chemical oxidizers in the well treatment fluid at in-situ conditions.

In addition to chemical oxidizers, enzymes are also commonly used as breakers. Enzymes are catalytic and substrate specific and catalyze the hydrolysis of specific bonds on the polymeric viscosifying agent. An enzyme will degrade many polymer bonds in the course of its lifetime. Unfortunately, enzymes operate under a narrow temperature range and their functional states are often inactivated at high temperatures.

More recent interest in hydraulic fracturing has focused on slickwater fracturing which is often used in the stimulation of tight gas reservoirs. In slickwater fracturing, a well is stimulated by pumping water at high rates into the wellbore, thereby creating a fracture in the productive formation. Slickwater fluids are basically fresh water or brine having sufficient friction reducing agent(s) to minimize tubular friction pressures. Generally, such fluids have viscosities only slightly higher than unadulterated fresh water or brine. Such fluids are much cheaper than conventional fracturing fluids which contain a viscosifying agent. In addition, the characteristic low viscosity of such fluids facilitates reduced fracture height growth in the reservoir during stimulation.

When aqueous fluids (like slickwater fracturing fluids) not containing a viscosifying polymer are used in stimulation, the pressure during the pumping stage is normally lower than that required in fracturing treatments using viscosifying polymers. The frictional drag of the frac fluid is lowered by the presence of the friction reduction agent(s) in the slickwater fluid. While slickwater fluids introduce less damage into the formation in light of the absence of viscosifying polymers, the friction reduction agent, if left in the formation, can cause formation damage. Effective means of degrading friction reduction agents in slickwater fracturing fluids is desired in order to minimize damage to the treated formation.

Similar to stimulation fluids, other fluids used to treat wells must be removed following the completion of the treatment operation for which such fluids are used. For instance, polymeric viscosifying agents frequently used in drilling muds and well completion fluids have a damaging effect since they tend to interfere with other phases of drilling and/or completion operations, as well as production of the well after such operations are finished. For example, drilling fluids tend to seep into the surrounding formation forming a filter cake on the wall of the wellbore. The filter cake sometimes can prevent casing cement from properly bonding to the wall of the wellbore. It is important in such operations that the viscosifying agents and other components of the drilling mud be removed from the well in order to enhance the recovery of hydrocarbons. Conventionally, oxidative breakers have been used to degrade the polysaccharide-containing filter cakes and residual damaging materials which reduce their viscosity.

In addition to seeking alternative breakers for use in high temperature environments, there has been an increasing demand for the development of well treatment agents, including breakers, which are environmentally friendly.

SUMMARY OF THE INVENTION

An aqueous well treatment fluid is provided which contains an ylide or a vitamin B cofactor selected from the group consisting of vitamin $B_1$, $B_2$, $B_3$, $B_6$, $B_9$ and $B_{12}$. The ylide and vitamin B cofactor functions as a breaker to degrade viscosifying polymers and/or friction reduction polymeric agents in a well treatment fluid.

The well treatment fluid may further include hydratable polymer and, optionally, a crosslinking agent capable of crosslinking the hydratable polymer.

The breaker is catalytically active and temperature stable in a temperature range of about 75° F. to about 300° F. and in a pH range of about 8.0 to about 12.0.

In an aspect of the invention, a preferred ylide breaker is vitamin $B_1$.

As an embodiment of the present invention, a method of fracturing a subterranean formation that is penetrated by a wellbore is provided. In this embodiment, an aqueous fluid containing one or more hydratable polymers, an optional crosslinking agent capable of crosslinking the hydratable polymer(s) and a breaker of an ylide or a vitamin B selected from the group consisting of vitamin $B_1$, $B_2$, $B_3$, $B_6$, $B_9$ and $B_{12}$ forms a gel. The polymer gel is pumped to a desired location within the wellbore under sufficient pressure to fracture the subterranean formation. The breaker is allowed to degrade the polymer gel so that it can be recovered or removed from the subterranean formation. The breaker is catalytically active and temperature stable in a temperature range of about 75° F. to about 300° F. The pH range of the fluid is typically greater than about 8.0.

In another embodiment, the breaker may be used in slickwater fracturing to degrade friction reduction agents and polymers used during the slickwater operation.

In another embodiment, the breaker may be used in drilling operations to remove viscosifying polymers from the well in order to enhance the recovery of hydrocarbons.

In another embodiment, the breaker may be used in sand control operations.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
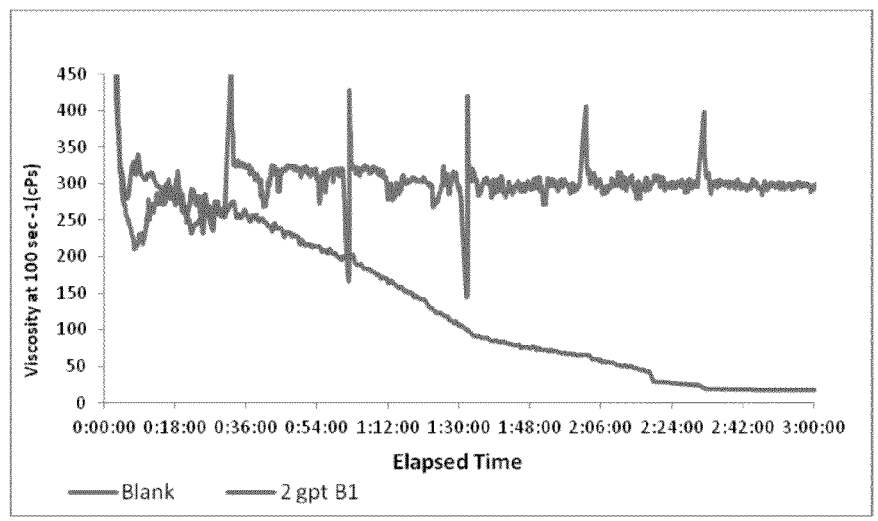
FIG. 1 depicts the effect of vitamin $B_1$ as a breaker in a crosslinked fluid containing underivatized guar.
Figure 2:
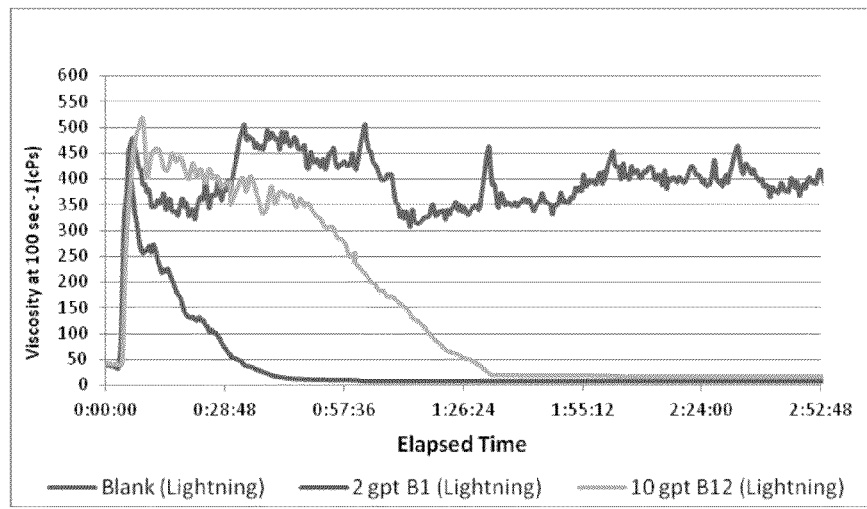
FIG. 2 and FIG. 3 depict the effectiveness of vitamin $B_1$ and vitamin $B_{12}$ as a breaker in a crosslinked fluid containing underivatized guar.
Figure 3:
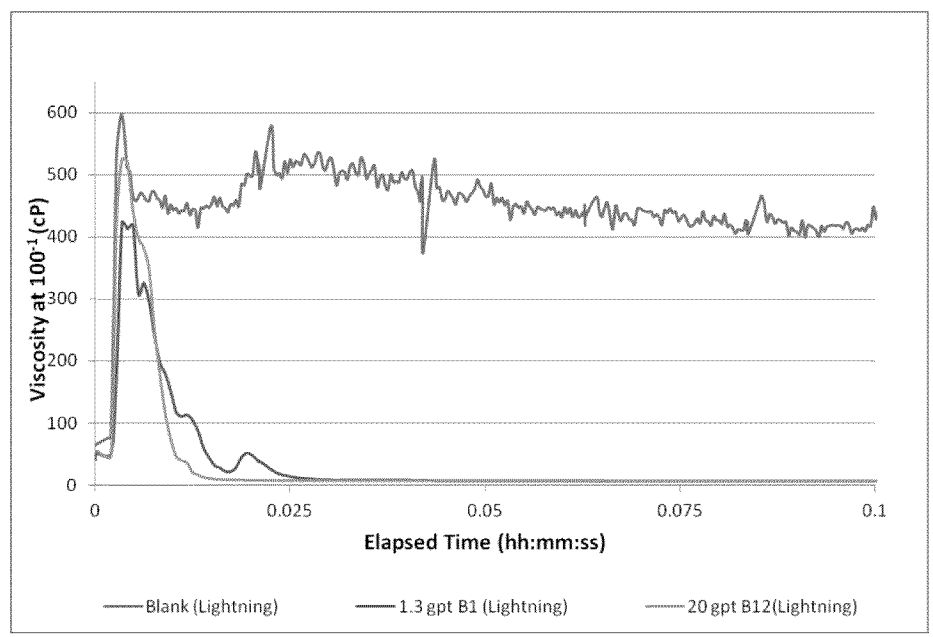
Figure 4:
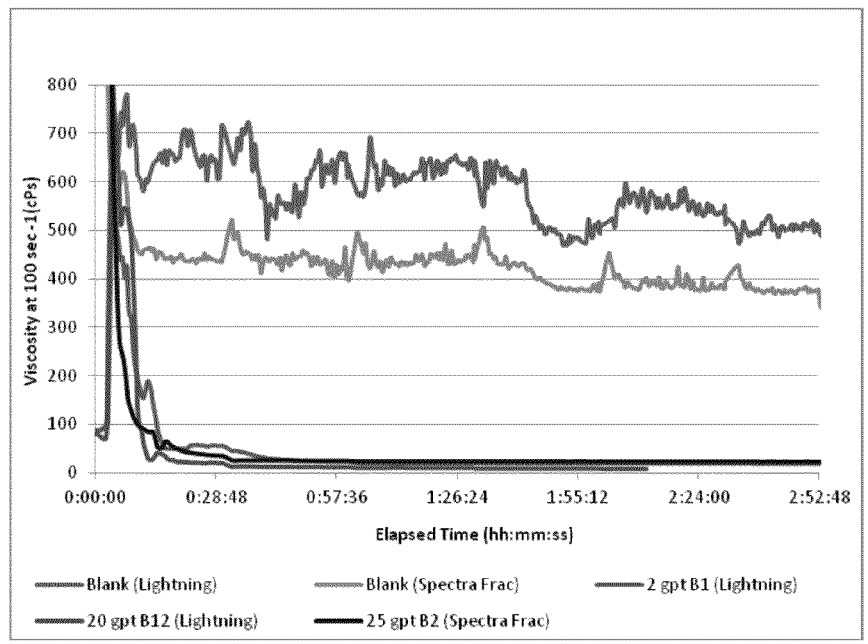
FIG. 4 demonstrates the effectiveness of vitamins $B_1$, $B_2$ and $B_{12}$ in crosslinked fluids containing underivatized guar.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

In accordance with an embodiment of the present disclosure, a well treatment fluid is provided which contains a viscosifying polymer and a breaker. The breaker is an glide or vitamin B cofactor. Such breakers are biodegradable, nontoxic, biocompatible and are based on renewable resources.

Suitable ylides include phosphonium ylides (such as those of the formula P, sulfonium ylides, sulfoxonium ylides, carbonyl ylides, oxonium ylides, nitrogen-based ylids such as azomethine ylids, and halonium ylides such as those prepared from allyl halides and metal carbenoids. In a preferred embodiment, such ylides contain $C_1$-$C_8$ alkyl groups, $C_6$-$C_{14}$ aryl groups or substituted alkyl or aryl groups.

Exemplary of the ylides are vitamin $B_1$.

Suitable carbonyl ylides include those of the formula (depicted in a multiple bond form in their ylene resonance structure) $R^1R^2C=O^+C^-R^3R^4$; suitable azomethine ylides include those of the formula of the $R^1R^2C=NR^{5+}C^-R^3R^4$; suitable oxonium ylides are those of the formula $R^1R^2C-O^+C^-R^3R^4$; suitable phosphonium ylides are those of the formula $R^1R^2R^3P^+C^-R^4R^5$; wherein $R^1$, $R^2$, $R^3$, $R^4$ and $R^5$ are preferably hydrogen, a $C_1$-$C_8$ alkyl or substituted alkyl group or a $C_6$-$C_{14}$ aryl group or substituted aryl group.

Suitable vitamin Bs include vitamin $B_1$, vitamin $B_2$, vitamin $B_3$, vitamin $B_6$, vitamin $B_9$ and vitamin $B_{12}$ and mixtures thereof.

The breaker effectively hydrolyzes viscosifying polymers of viscous fluids at elevated temperature ranges, such as in excess of 75° F., typically over pH ranges between from about 8.0 to about 12.0 with the maximum activity at pH from about 10.0 to about 11.5. The breaker hydrolyzes the viscosifying polymer at temperatures in excess of 225° F. as well as in excess of 300° F. In addition, the breaker may be used in combination with other enzymes and/or oxidative breakers to degrade gels over broader temperature and pH ranges.

In an embodiment, the aqueous fluid used in the invention may be prepared by blending a hydratable polymer into an aqueous fluid. The aqueous fluid could be, e.g., water, brine, or water-alcohol mixtures. Any suitable mixing apparatus may be used for this procedure. In the case of batch mixing, the hydratable polymer and aqueous fluid are blended for a period of time which is sufficient to form a hydrated sol. The hydratable polymer is added to the aqueous fluid in concentrations ranging from about 0.10% to 5.0% by weight of the aqueous fluid. The most preferred range for the present invention is about 0.20% to 0.80% by weight.

The hydratable polymer may contain one or more functional groups, such as a hydroxyl, carboxyl, carboxymethyl, hydroxypropyl, sulfate, sulfonate, amino or amido group. Preferred polymers include polysaccharides and derivatives thereof, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Suitable polysaccharides and derivatives include those which contain one or more monosaccharide units of galactose, fructose, mannose, glucoside, glucose, xylose, arabinose, glucuronic acid and pyranosyl sulfate. These include non-derivatized and derivatized guar gums, locust bean gum, tara, xanthan, succinoglycan, scleroglucan and carrageenan. These polysaccharides include guar gums and derivatives, starches and galactomannan gums. In a preferred embodiment, guar gum may be underivatized guar or a derivatized guar, such as a hydroxyalkyl guar (like hydroxypropyl guar), a carboxyalkyl guar (like carboxymethyl guar) and a carboxyalkylhydroxyalkyl guar like carboxymethylhydroxypropyl).

Further, the polysaccharide may be a cellulose or cellulose derivative such as an alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

The hydratable polymer useful in the present invention is underivatized guar as well as derivatized guars. Underivatized guar is preferred along with the following derivatized guars: hydroxypropyl guar, carboxymethyl guar, carboxymethyl hydroxypropyl guar, and carboxymethyl hydroxyethyl cellulose.

In addition to the breaker and hydratable polymer, the fluid may include a crosslinking agent. Suitable crosslinking agents include borate ion releasing compounds, organometallic or organic complexed metal ions comprising at least one transition metal or alkaline earth metal ion as well as mixtures thereof.

Borate ion releasing compounds which can be employed include, for example, any boron compound which will supply borate ions in the fluid upon disassociation from the deformable core. Such compounds include boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. Mixtures of any of the referenced borate ion releasing compounds may further be employed. Such borate-releasers typically require a basic pH (e.g., 8.0 to 12) for crosslinking to occur.

Further preferred crosslinking agents are those, such as organometallic and organic complexed metal compounds, which can supply trivalent or higher polyvalent metal ions into the fluid upon their disassociation from the deformable core. Examples of the trivalent or higher polyvalent metal ions include boron, titanium, zirconium, aluminum, yttrium, cerium, etc. or a mixture thereof. Examples of titanium compounds include titanium ammonium lactate, titanium triethanolamine, titanium acetylacetonate, titanium diisopropoxide bisacetyl aminate, titanium tetra(2-ethyl hexoxide), titanium tetraisopropoxide, titanium di(n-butoxy)bistriethanol aminate, titanium isopropoxyoctylene glycolate, titanium diisopropoxy bistriethanol aminate and titanium chloride. Examples of zirconium salts include zirconium ammonium carbonate, zirconium carbonate, zirconium acetylacetonate, zirconium diisopropylamine lactate, zirconium chloride, zirconium lactate, zirconium lactate triethanolamine, zirconium oxyacetate, zirconium acetate, zirconium oxynitrate, zirconium sulfate, tetrabutoxyzirconium (butyl zirconate), zirconium mono(acetylacetonate), zirconium n-butyrate and zirconium n-propylate. The crosslinking agent may optionally be encapsulated. Examples of typical crosslinking agents include, but are not limited to, those described in U.S. Pat. No. 4,514,309 and U.S. Pat. No. 5,247,995, which are incorporated herein by reference.

The crosslinking agent can be polymers with metal ions including aluminum, antimony, zirconium and titanium containing compounds including the so-called organotitanates as well as borates and boron releasing compounds. In the case of the borate crosslinkers, the crosslinking agent is any material which supplies borate ions. Suitable borate crosslinkers include organoborates, monoborates, polyborates, mineral borates, boric acid, sodium borate, including anhydrous or any hydrate, borate ores such as colemanite or ulexite as well as any other borate complexed to organic compounds to delay the release of the borate ion. Borate crosslinking agents are preferred.

The crosslinking agent is preferably present in the range from about 0.001% to in excess of 0.5% by weight of the aqueous fluid. Preferably, the concentration of crosslinking agent is in the range from about 0.005% to about 0.25% by weight of the aqueous fluid.

Typically, the amount of breaker used in the treatment fluid is from about 0.5 to about 30 gpt, more typically between from about 1.0 to about 5.0 gpt.

The optimum pH of the aqueous fluid containing the crosslinkable polymer is alkaline and typically greater than or equal to 8.0, more typically greater than or equal to 9.0, most typically between from about 9.5 to about 12.0.

The fluid may also contain other conventional additives common to the well service industry such as surfactants, corrosion inhibitors, crosslinking delaying agents and the like.

The well treatment fluid may be prepared on location using a high shear foam generator or may be shipped to the desired location.

In an embodiment, the well treatment fluid is used as a fracturing fluid. When used as a fracturing fluid, the fluid is pumped at sufficiently high pressures to cause the formation or enlargement of fractures and to place proppant into the fracture.

When used as a fracturing fluid, the fluid may further contain a proppant which are normally added to the fluid prior to the addition of the crosslinking agent. Suitable proppants include those conventionally known in the art including quartz sand grains, glass beads, aluminum pellets, ceramics, plastic beads, including polyamides, and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc.

Further the proppant may include porous ceramics or organic polymeric particulates. The porous particulate material may be treated with a non-porous penetrating material, coating layer or glazing layer. For instance, the porous particulate material may be a treated particulate material, as defined in U.S. Patent Publication No. 20050028979 wherein (a) the ASG of the treated porous material is less than the ASG of the porous particulate material; (b) the permeability of the treated material is less than the permeability of the porous particulate material; or (c) the porosity of the treated material is less than the porosity of the porous particulate material.

The propping agents are normally used in concentrations between about 1 to 8 pounds per gallon of fracturing fluid composition, but higher or lower concentrations can be used as required.

In an embodiment, the breaker may be used in slickwater fracturing, a type of hydraulic fracturing that uses a low viscosity aqueous fluid to induce the subterranean fracture. The fluid may further contain a non-crosslinked or linear gel. The slickwater fluid may be crosslinked or may consist of a linear viscosifying agent. The fluid containing the breaker typically has a viscosity only slightly higher than unadulterated fresh water or brine and typically contains a friction reduction agent. Typically, the friction reduction agent present in slickwater does not increase the viscosity of the fracturing fluid by more than 1 to 2 centipoises (cP). The breaker described herein is useful in degrading the friction reduction agent and polymers used during the slickwater operation.

In addition to fracturing, the breaker may be used in other well treatment operations. For instance, in an embodiment, the breaker may be used with drilling fluids in order to remove viscosifying polymers from the well in order to enhance the recovery of hydrocarbons.

In another embodiment, the breaker may be used in sand control operations in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins is so desired. Particulates within the same class of products listed as proppants defined herein may further be included in well treatment operations relating to sand control.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Examples 1-10

The effectiveness of vitamin B cofactors as breakers were tested with:

A. an aqueous crosslinked fluid containing a borated crosslinked underivatized guar, buffered to a pH between from about 9.5 to about 10.5, prepared as set forth in U.S. Patent Publication No. 2005/0272612;

B. an aqueous crosslinked fluid containing a borated crosslinked underivatized guar, buffered to a pH between from about 9.5 to about 10.5, prepared as set forth in U.S. Pat. No. 5,082,579; and C. a slickwater fluid containing about 8 ppt of polyacrylamide friction reducer, commercially available as FRW-20 from Baker Hughes Incorporated. The fluids were tested on a Chandler 5550 viscometer pre-heated to an elevated temperature at a constant shear rate of 100 $sec^{-1}$ initially and then every 30 minutes for 3 hours. Table I provides the testing conditions. The last column of Table I sets forth the Figures to which the resulting data correspond:

TABLE I

| Ex. No. | Fluid | Amount of Fluid, ppt | Cofactor | Amount of Cofactor, gpt | Temp., °F. | FIG. |
|---|---|---|---|---|---|---|
| 1 | A | 17 | B1 | 2 | 150 | 1 |
| 2 | A | 22 | B1 | 2 | 175 | 2 |
| 3 | A | 22 | B12 | 10 | 175 | 2 |
| 4 | A | 25 | B1 | 1.3 | 200 | 3 |
| 5 | A | 25 | B12 | 20 | 200 | 3 |
| 6 | A | 30 | B12 | 20 | 225 | 4 |
| 7 | A | 30 | B1 | 2 | 225 | 4 |
| 8 | B | 35 | B2 | 25 | 225 | 4 |
| 9 | C | 8 | B1 | 25 | 150 | 5 |
| 10 | C | 8 | B12 | 16 | 150 | 5 |

Figure 5:
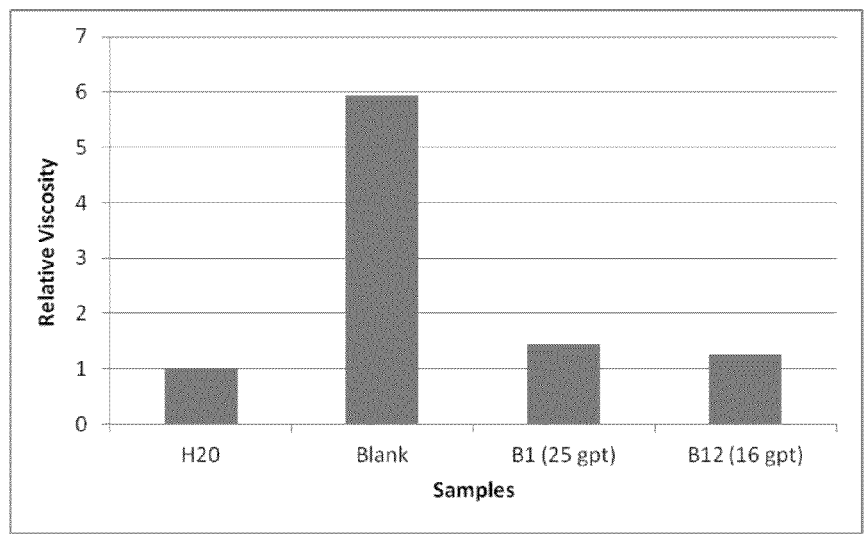
FIG. 5 illustrates the effect of vitamins $B_1$ and $B_{12}$ in a slickwater fluid.

Examples 1, 2 and 4 illustrate that vitamin B1 degrades the underivatized guar polymer quickly. Examples 3, 5 and 6 demonstrate that B12 functions much slower than B1. Examples 6, 7 and 8 demonstrate that vitamins B1, B2 and B12 are more effective at elevated temperatures. No rebound in fluid viscosity was noted after the fluids were cooled. FIG. 5 illustrates the effect of vitamins B1 and B12 in a slickwater fluid.

Examples 11-12

Figure 6:
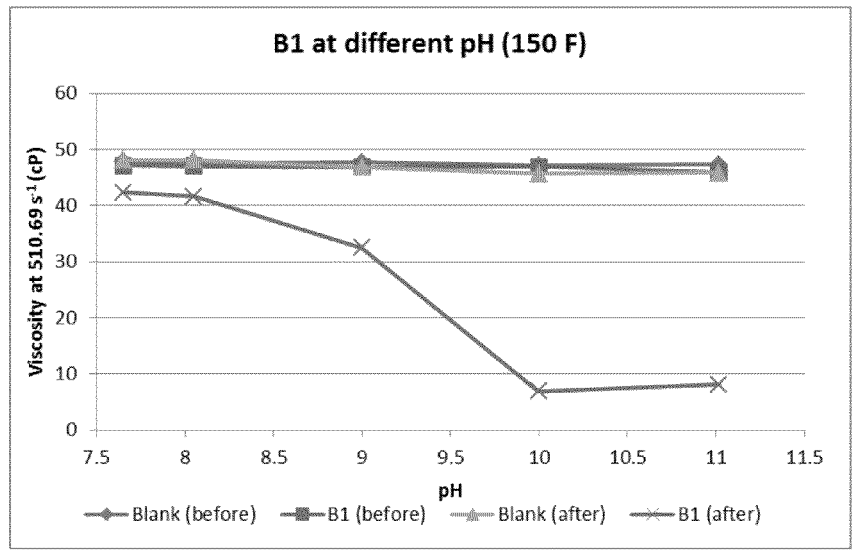
FIG. 6 illustrates the effect of pH in a crosslinked fluid containing underivatized guar and cofactor $B_1$ as breaker.
Figure 7:
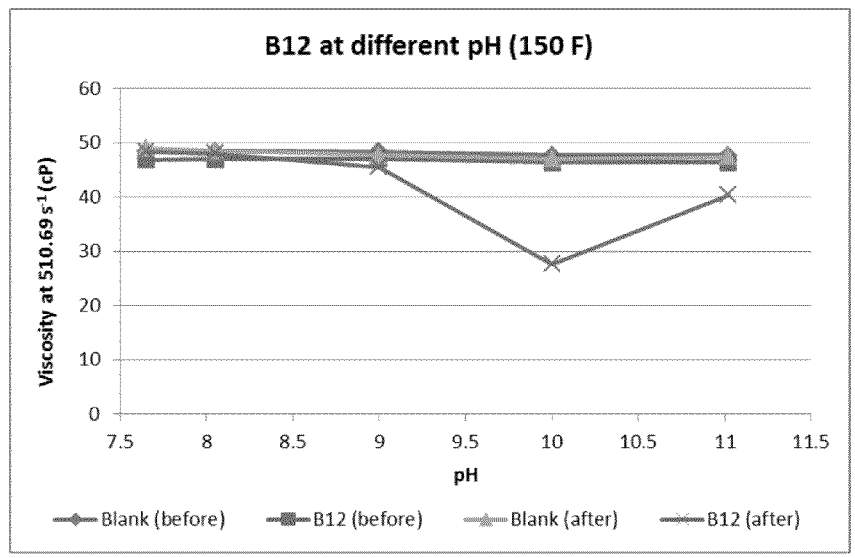
FIG. 7 illustrates the effect of pH in a crosslinked fluid containing underivatized guar and cofactor $B_{12}$ as breaker.

The effects of pH on the viscosity of vitamins B1 and B12 on Fluid A were tested before heating Fluid A and after heating Fluid A at 150° F. for overnight. The results, set forth in FIGS. 6 and 7, demonstrate that the effectiveness of cofactor B1 as a breaker was best at a pH between from 9.5 and 11 and the effectiveness of B12 as a breaker was best at a pH of about 10.

From the foregoing, it will be observed that numerous variations and modifications may be effected without departing from the true spirit and scope of the novel concepts of the invention.

What is claimed is:

1. An aqueous fracturing fluid comprising:
   (a) a viscosifying polymer; and
   (b) a breaker comprising an ylide or a vitamin B cofactor selected from the group consisting of vitamin $B_1$, vitamin $B_2$, vitamin $B_3$, vitamin $B_6$, vitamin $B_9$, vitamin $B_{12}$, and mixtures thereof
wherein the pH of the aqueous fracturing fluid is greater than or equal to 8.0.

2. The aqueous fracturing fluid of claim 1, wherein the breaker is selected from the group consisting of vitamin $B_1$, vitamin $B_2$, vitamin $B_{12}$, and mixtures thereof.

3. The aqueous fracturing fluid of claim 1, wherein the breaker is an ylide.

4. The aqueous fracturing fluid of claim 3, wherein the breaker is vitamin $B_1$.

5. The aqueous fracturing fluid of claim 3, wherein the breaker is an ylide of phosphorus, sulfur, oxygen, nitrogen or halogen.

6. The aqueous fracturing fluid of claim 1, wherein the viscosifying polymer is (i) a synthetic polymer selected from the group consisting of polyvinyl alcohols, polyacrylates, polypyrrolidones and polyacrylamides; or (ii) a polysaccharide selected from the group consisting of cellulosic derivatives, galactomannan or a galactomannan derivative, xanthan, succinoglycan and scleroglucan; and mixtures thereof.

7. The aqueous fracturing fluid of claim 6, wherein the polysaccharide is a cellulosic derivative selected from the group consisting of hydroxyalkyl celluloses, alkylcarboxyhydroxy celluloses and carboxyalkyl cellulose derivatives.

8. The aqueous fracturing fluid of claim 7, wherein the cellulosic derivative is selected from the group consisting of hydroxyethyl cellulose, methylhydroxyethyl cellulose, ethylhydroxyethyl cellulose, carboxymethylhydroxyethyl cellulose and methylhydroxypropyl cellulose.

9. The aqueous fracturing fluid of claim 6, wherein the polysaccharide is selected from the group consisting of guar gum, hydroxypropylguar, carboxymethylguar, carboxymethylhydroxypropylguar, xanthan gum and scleroglucan.

10. The aqueous fracturing fluid of claim 1, further comprising a crosslinking agent.

11. The aqueous fracturing fluid of claim 10, wherein the crosslinking agent is a borate ion releasing compound or an organometallic containing either zirconium or titanium.

12. The aqueous fracturing fluid of claim 10, wherein the pH of the fluid is greater than or equal to 9.0.

13. The aqueous fracturing fluid of claim 1, further comprising an enzyme.

14. A method of fracturing a subterranean formation penetrated by a wellbore, the method comprising the steps of:
(a) injecting the aqueous fracturing fluid of claim 1 into the wellbore at a pressure sufficient to create or enlarge a fracture in the subterranean formation;
(b) reducing the viscosity of the fluid at an elevated temperature by allowing the breaker to degrade the viscosifying polymer; and
(c) removing the degraded viscosifying polymer from the subterranean formation.

15. The method of claim 14, wherein the breaker is thermally stable at a temperature of at least 75° F.

16. The method of claim 14, wherein the aqueous fracturing fluid is slickwater.

17. The method of claim 14, wherein the breaker is selected from the group consisting of vitamin $B_1$, vitamin $B_2$ and vitamin $B_{12}$ and mixtures thereof.

18. The method of claim 14, wherein the viscosifying polymer is (i) a synthetic polymer selected from the group consisting of polyvinyl alcohols, polyacrylates, polypyrrolidones and polyacrylamides; or (ii) a polysaccharide selected from the group consisting of cellulosic derivatives, galactomannan or a galactomannan derivative, xanthan, succinoglycan and scleroglucan; and mixtures thereof.

19. The method of claim 18, wherein the fluid further comprises a crosslinking agent.

20. The method of claim 19, wherein the viscosifying polymer is galactomannan or a galactomannan derivative.

21. The method of claim 20, wherein the viscosifying polymer is selected from the group consisting of guar, carboxymethyl guar, hydroxypropylguar and carboxymethylhydroxypropylguar.

22. A method of fracturing a subterranean formation penetrated by a wellbore which comprises introducing into the subterranean formation the aqueous fracturing fluid of claim 1 at a pressure sufficient to enlarge or create a fracture.

23. The method of claim 22, wherein the breaker is selected from the group consisting of vitamin $B_1$, vitamin $B_2$, vitamin $B_{12}$, and mixtures thereof.

* * * * *